United States Patent
Hamano

(10) Patent No.: US 9,578,232 B2
(45) Date of Patent: Feb. 21, 2017

(54) IMAGE CAPTURING APPARATUS, METHOD FOR CONTROLLING THE SAME, AND STORAGE MEDIUM

(71) Applicant: CANON KABUSHIKI KAISHA, Tokyo (JP)

(72) Inventor: Hideyuki Hamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/984,557

(22) Filed: Dec. 30, 2015

(65) Prior Publication Data

US 2016/0205309 A1 Jul. 14, 2016

(30) Foreign Application Priority Data

Jan. 9, 2015 (JP) ................. 2015-003605

(51) Int. Cl.
*H04N 5/232* (2006.01)
*H04N 5/235* (2006.01)
*H04N 9/04* (2006.01)

(52) U.S. Cl.
CPC ........ *H04N 5/23212* (2013.01); *H04N 5/2351* (2013.01); *H04N 5/2355* (2013.01); *H04N 5/23296* (2013.01); *H04N 9/04* (2013.01); *H04N 9/045* (2013.01)

(58) Field of Classification Search
CPC ............ H04N 5/23212; H04N 5/23296; H04N 5/2351; H04N 5/23293; H04N 5/2355; H04N 5/217; H04N 5/23219; H04N 9/04; G03B 13/36; G02B 7/28
See application file for complete search history.

(56) References Cited

U.S. PATENT DOCUMENTS

| 4,969,045 | A | * | 11/1990 | Haruki | ................. | H04N 5/2351 |
|---|---|---|---|---|---|---|
| | | | | | | 348/229.1 |
| 6,636,262 | B1 | * | 10/2003 | Okajima | ................ | H04N 5/238 |
| | | | | | | 348/350 |
| 7,593,053 | B2 | * | 9/2009 | Ito | ........................... | G02B 7/28 |
| | | | | | | 348/208.12 |
| 8,106,958 | B2 | * | 1/2012 | Takahashi | ................ | H04N 1/62 |
| | | | | | | 348/222.1 |

(Continued)

FOREIGN PATENT DOCUMENTS

| JP | 2009-103800 A | 5/2009 |
|---|---|---|
| JP | 2010-078810 A | 4/2010 |
| JP | 2012-137530 A | 7/2012 |

*Primary Examiner* — Michael Osinski
(74) *Attorney, Agent, or Firm* — Cowan, Liebowitz & Latman, P.C.

(57) ABSTRACT

An image capturing apparatus includes: an image sensor; a focus adjusting unit configured to adjust a focus state of the subject image; an acquisition unit configured to acquire luminance signals of colors from signals obtained from a plurality of unit focus detection areas; a normalization unit configured to normalize the acquired luminance signals of the colors of the unit focus detection areas; a calculation unit configured to calculate normalized focus evaluation values of the colors that indicate a focus state of the subject image; and a determination unit configured to determine a driving direction of the focus adjusting unit based on magnitude relations of a first normalized focus evaluation value that corresponds to a first color and a second normalized focus evaluation value that corresponds to a second color.

12 Claims, 8 Drawing Sheets

(56) References Cited

U.S. PATENT DOCUMENTS

| | | | |
|---|---|---|---|
| 8,248,516 B2* | 8/2012 | Ishii | G03B 13/36 |
| | | | 348/345 |
| 8,525,919 B2* | 9/2013 | Ishii | G03B 13/36 |
| | | | 348/346 |
| 9,298,883 B2* | 3/2016 | Kurtz | A61B 3/10 |
| 2004/0061797 A1* | 4/2004 | Takahashi | H04N 1/00283 |
| | | | 348/333.01 |
| 2008/0192139 A1* | 8/2008 | Kanai | H04N 5/23212 |
| | | | 348/360 |
| 2008/0239136 A1* | 10/2008 | Kanai | G06T 7/0018 |
| | | | 348/340 |
| 2012/0008005 A1* | 1/2012 | Fukunishi | H04N 5/145 |
| | | | 348/222.1 |
| 2014/0063330 A1* | 3/2014 | Matsuyama | H04N 5/2353 |
| | | | 348/352 |
| 2015/0125070 A1* | 5/2015 | Atif | G06T 7/0069 |
| | | | 382/154 |
| 2015/0163395 A1* | 6/2015 | Konishi | H04N 5/2353 |
| | | | 348/230.1 |
| 2016/0234423 A1* | 8/2016 | Miyazawa | H04N 5/232 |
| 2016/0295102 A1* | 10/2016 | Kanda | H04N 5/23212 |

* cited by examiner

FIG. 8
|  | SET1 | SET2 |
|---|---|---|
| NORMALIZATION GAIN DETERMINATION THRESHOLD | A1 | A2 |
| NORMALIZATION GAIN DIFFERENCE DETERMINATION THRESHOLD | B1 | B2 |
| Y INTEGRAL EVALUATION VALUE DIFFERENCE DETERMINATION THRESHOLD | C1 | C2 |
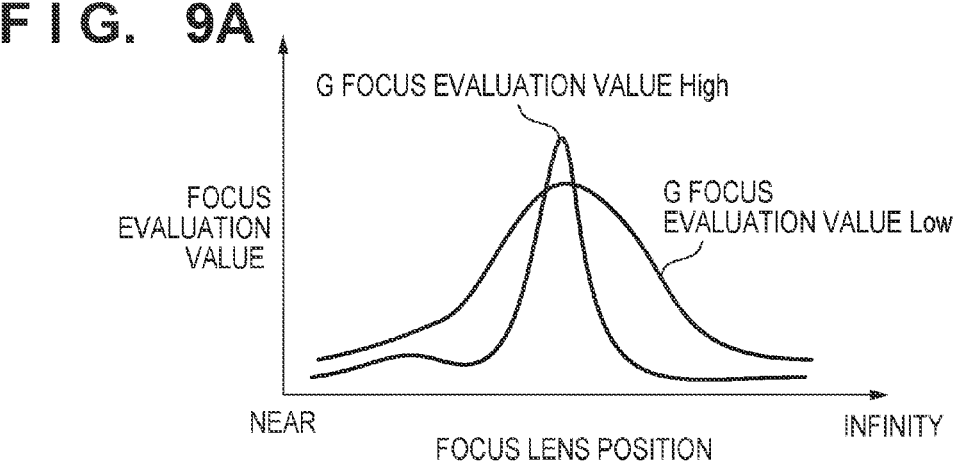
FIG. 9A
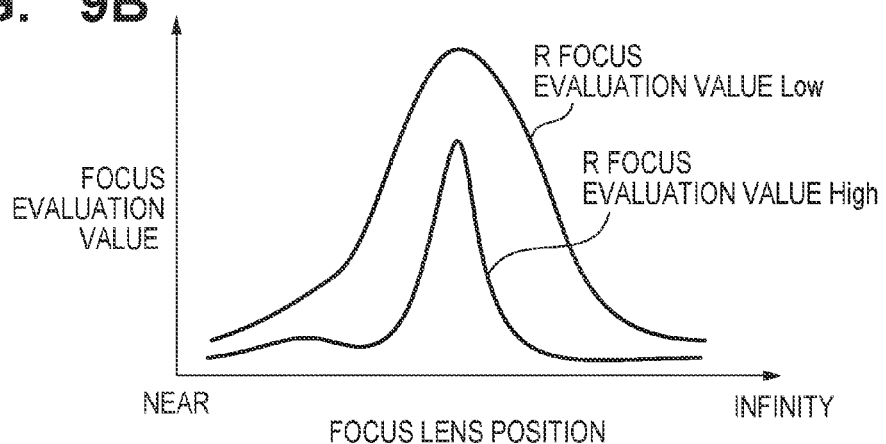
FIG. 9B

IMAGE CAPTURING APPARATUS, METHOD FOR CONTROLLING THE SAME, AND STORAGE MEDIUM

BACKGROUND OF THE INVENTION

1. Field of the Invention

The present invention relates to an image capturing apparatus such as a digital still camera or a digital video camera that performs focus adjustment using an image signal obtained by an image sensor.

2. Description of the Related Art

Digital cameras and video cameras often use a so-called contrast detection autofocus (hereinafter, abbreviated as "AF"), which is an AF method for focusing on a subject by detecting, using output signals from an image sensor such as a CCD sensor or a CMOS sensor, a signal depending on the contrast of the subject.

In the contrast detection AF, contrast evaluation values are obtained while changing the focal position of an imaging optical system, and the focal position at which the contrast evaluation value is the local maximum value is detected as an in-focus position. Accordingly, there is the problem that the focus adjustment direction to approach the in-focus position is unclear at the start of focus adjustment in a defocus state. If focus adjustment is started in the state in which the focus adjustment direction is unclear, the focus adjustment is likely to be performed in a wrong direction. In this case, based on a reduction in the contrast evaluation value, the fact that the focus adjustment is being performed in a wrong direction can be detected, but the focus adjustment requires a longer time.

In order to solve such a problem, a method for detecting a focus adjustment direction to approach an in-focus position at the start of focus adjustment, using chromatic aberration caused by an imaging optical system has been proposed (Japanese Patent Laid-Open No. 2009-103800). In Japanese Patent Laid-Open No. 2009-103800, image sensors that respectively receive beams of light that have different wavelengths are provided, and a focus adjustment direction to approximate an in-focus state can be detected based on a difference between outputs of the image sensors. At that time, in order to correspond to the spectral distribution of a subject image, output signals of the wavelengths are normalized with a difference between the maximum and minimum values of luminance values in a focus detection area, and the normalized output signals are used to detect the focus adjustment direction. Accordingly, even if the spectral distribution of the subject image is uneven and the subject has, for example, a reddish color, it is possible to detect the focus adjustment direction by comparing the normalized contrast evaluation values of the wavelengths.

Furthermore, in Japanese Patent Laid-Open No. 2009-103800, reliability determination whether or not the focus adjustment using chromatic aberration can be performed with accuracy is performed, based on a difference between the maximum and minimum values of the luminance values in the focus detection area. Accordingly, if it is considered that the focus adjustment using chromatic aberration is less reliable, normal contrast detection type focus adjustment will be performed, making it possible to ensure the focus adjustment accuracy.

However, depending on the spectral distribution of the subject image, there is a case where it is not possible to correctly detect the focus adjustment direction to approach the in-focus position. For example, if a tone is varied in the focus detection area, namely, for example, a part of the focus detection area is green and another part thereof is red, the focus adjustment direction cannot correctly be detected by the method disclosed in Japanese Patent Laid-Open No. 2009-103800. This is because a difference between the maximum and minimum values of the luminance values in the focus detection area cannot express the spectral distribution in the focus detection area correctly.

Furthermore, for the same reason, there is the risk that reliability determination using a difference between the maximum and minimum values of the luminance values in the focus detection area is made erroneously.

SUMMARY OF THE INVENTION

The present invention was made in view of the above-described problems, and enables, at the time of detection of a focus adjustment direction using chromatic aberration of an imaging optical system, accurate detection of the focus adjustment direction and thus a focus adjustment operation with a higher speed.

According to the first aspect of the present invention, there is provided an image capturing apparatus comprising: an image sensor configured to photoelectrically convert a subject image formed by an imaging optical system; a focus adjusting unit configured to adjust a focus state of the subject image on the image sensor; an acquisition unit configured to acquire luminance signals of colors from signals obtained from a plurality of unit focus detection areas forming a focus detection area of the image sensor; a normalization unit configured to normalize the acquired luminance signals of the colors of the unit focus detection areas using the signals obtained from the unit focus detection areas; a calculation unit configured to calculate normalized focus evaluation values of the colors that indicate a focus state of the subject image using the normalized luminance signals of the colors; and a determination unit configured to determine a driving direction of the focus adjusting unit based on magnitude relations of a first normalized focus evaluation value that corresponds to a first color and a second normalized focus evaluation value that corresponds to a second color.

According to the second aspect of the present invention, there is provided a method for controlling an image capturing apparatus that includes an image sensor configured to photoelectrically convert a subject image formed by an imaging optical system, and a focus adjusting unit configured to adjust a focus state of the subject image on the image sensor, the method comprising: acquiring luminance signals of colors from signals obtained from a plurality of unit focus detection areas forming a focus detection area of the image sensor; normalizing the acquired luminance signals of the colors of the unit focus detection areas using the signals obtained from the unit focus detection areas; calculating normalized focus evaluation values of the colors that indicate a focus state of the subject image using the normalized luminance signals of the colors; and determining a driving direction of the focus adjusting unit based on a magnitude relations of a first normalized focus evaluation value that corresponds to a first color and a second normalized focus evaluation value that corresponds to a second color.

According to the third aspect of the present invention, there is provided a computer-readable storage medium having stored therein a program for causing a computer to execute the steps of a method for controlling an image capturing apparatus that includes an image sensor configured to photoelectrically convert a subject image formed by an imaging optical system, and a focus adjusting unit configured to adjust a focus state of the subject image on the image sensor, the method comprising: acquiring luminance signals of colors from signals obtained from a plurality of unit focus detection areas forming a focus detection area of the image sensor; normalizing the acquired luminance signals of the colors of the unit focus detection areas using the signals obtained from the unit focus detection areas; calculating normalized focus evaluation values of the colors that indicate a focus state of the subject image using the normalized luminance signals of the colors; and determining a driving direction of the focus adjusting unit based on a magnitude relations of a first normalized focus evaluation value that corresponds to a first color and a second normalized focus evaluation value that corresponds to a second color.

Further features of the present invention will become apparent from the following description of exemplary embodiments with reference to the attached drawings.

BRIEF DESCRIPTION OF THE DRAWINGS

FIG. 8 is a diagram illustrating sets of reliability thresholds according to the embodiment.

FIGS. 9A and 9B are diagrams illustrating the relation between focus lens positions and focus evaluation values of different bands for respective colors according to the embodiment.

DESCRIPTION OF THE EMBODIMENTS

Figure 1:
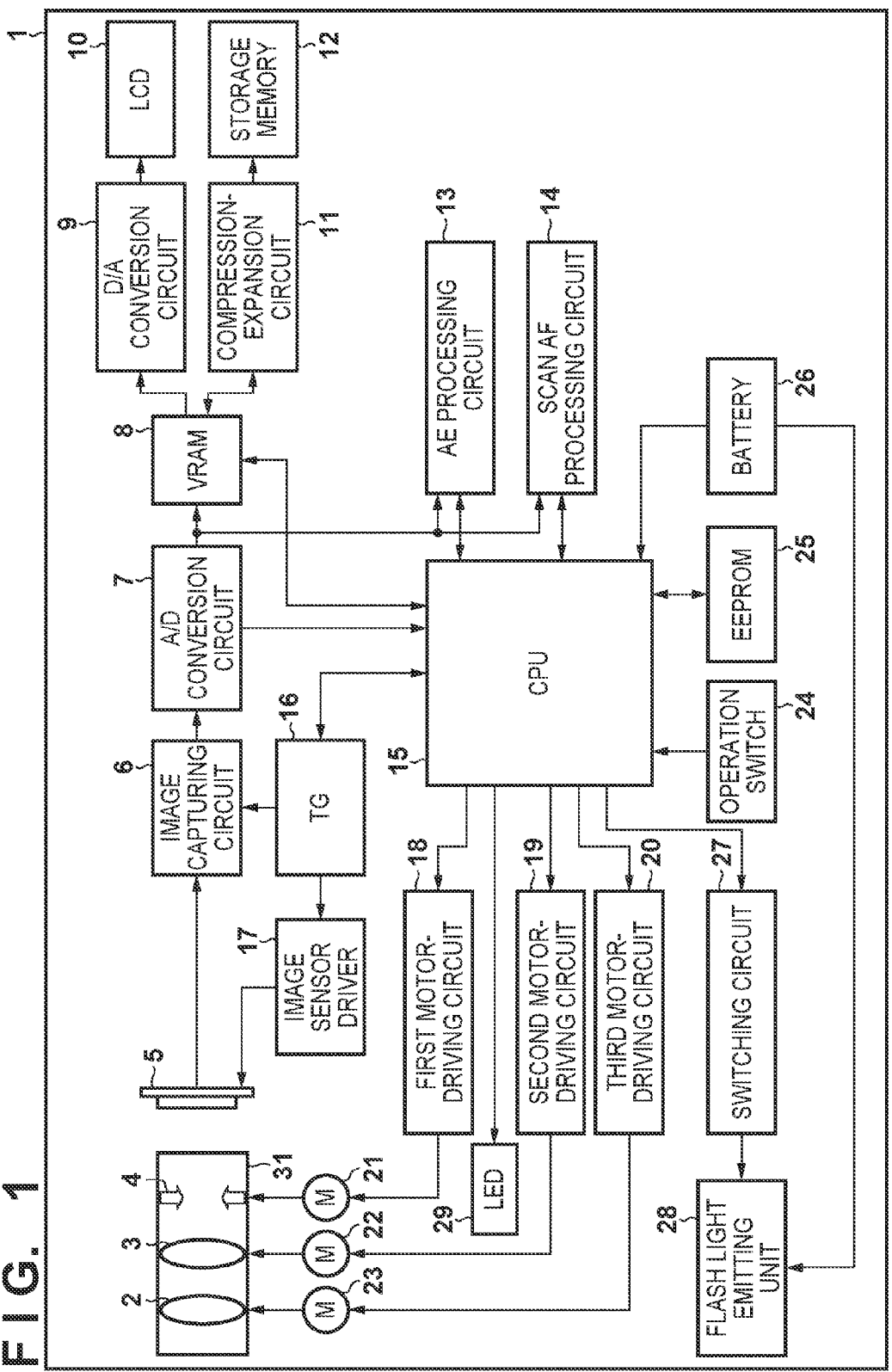
FIG. 1 is a block diagram illustrating an image capturing apparatus according to an embodiment of the present invention.

Hereinafter, an embodiment of the present invention will be described in detail with reference to the accompanying drawings. FIG. 1 is a block diagram illustrating an example of a schematic configuration of an image capturing apparatus including a focus adjusting unit according to an embodiment of the present invention. The image capturing apparatus includes, but without limiting, a digital still camera and a digital video camera, for example. The present invention is applicable to any image capturing apparatus as long as it acquires an electric image by an image sensor such as an area sensor in which elements are two-dimensionally arrayed and that photoelectrically converts an incident optical image.

Description of Block Diagram

In FIG. 1, the reference numeral 1 denotes an image capturing apparatus. The reference numeral 2 denote a zoom lens group and the reference numeral 3 denotes a focus lens group, the zoom lens group and the focus lens group constituting an imaging optical system. The reference numeral 4 denotes a diaphragm for controlling the amount of beams of light having passed through the imaging optical system. The reference numeral 31 denotes a lens barrel for accommodating the zoom lens group 2, the focus lens group 3, the diaphragm 4, and the like.

The reference numeral 5 denotes an image sensor that photoelectrically converts a subject image that is formed by the imaging optical system including the focus lens group 3 for adjusting the focus state of the subject image, and is a CCD sensor, a CMOS sensor, or the like. The reference numeral 6 denotes an image capturing circuit that receives an electric signal photoelectrically converted by the image sensor 5 and subjects the received electric signal to various image processing, so as to generate a predetermined image signal. The reference numeral 7 denotes an A/D conversion circuit that converts the analog image signal generated by the image capturing circuit 6 into a digital image signal.

The reference numeral 8 denotes a memory (VRAM) such as a buffer memory in which the digital image signal output from the A/D conversion circuit 7 is temporarily stored. The reference numeral 9 denotes a D/A conversion circuit that reads an image signal stored in the VRAM 8 and converts the read image signal into an analog signal that is an image signal appropriate for reproduction output.

The reference numeral 10 denotes an image display device such as a liquid crystal display device (LCD) that displays the image signals (hereinafter, the image display device being referred to as "LCD"). The reference numeral 12 denotes a storage memory that is for storing image data and is made from a semiconductor memory or the like. The reference numeral 11 denotes a compression-expansion circuit. The compression-expansion circuit 11 includes a compression circuit that reads an image signal temporarily stored in the VRAM 8, and performs compression processing or encoding processing of image data in order to convert the read image signal into a format appropriate for storage in the storage memory 12. The compression-expansion circuit 11 further includes an expansion circuit that performs decoding processing or expansion processing on image data stored in the storage memory 12 in order to convert the image data into a format appropriate for reproduction, display, or the like.

Furthermore, the reference numeral 13 denotes an AE processing circuit that receives an output from the A/D conversion circuit 7 and performs automatic exposure (AE) processing on the received output. The reference numeral 14 denotes a scan AF processing circuit that receives an output from the A/D conversion circuit 7 and performs autofocus (AF) processing on the received output. The scan AF processing circuit 14 functions as a focus evaluation value computation processing unit that extracts a specific frequency component from an image signal output from an image capturing area of the image sensor that corresponds to a focus detection area, and calculates a focus evaluation value. In the present embodiment, the focus detection area and an AF evaluation range have the same meaning.

Furthermore, the scan AF processing circuit 14 calculates an evaluation value for use in calculation of an in-focus position. This evaluation value will be described in detail later. The reference numeral 15 denotes a CPU that includes a memory for computation and controls the image capturing apparatus. The reference numeral 16 denotes a timing generator (hereinafter, abbreviated as "TG") that generates a predetermined timing signal.

The CPU 15 computes an in-focus position using various evaluation values calculated by the scan AF processing circuit 14. The reference numeral 17 denotes an image sensor driver. The reference numeral 21 denotes a diaphragm driving motor that drives the diaphragm 4. The reference numeral 18 denotes a first motor-driving circuit that controls driving of the diaphragm driving motor 21. The reference numeral 22 denotes a focus driving motor that drives the focus lens group 3. The focus lens group 3 and the focus driving motor 22 perform focus adjustment. The reference numeral 19 denotes a second motor-driving circuit that controls driving of the focus driving motor 22. The reference numeral 23 denotes a zoom driving motor that drives the zoom lens group 2. The reference numeral 20 denotes a third motor-driving circuit that controls driving of the zoom driving motor 23.

The CPU 15 controls the focus driving motor 22 via the second motor-driving circuit 19 based on the focus evaluation value calculated by the scan AF processing circuit 14. Furthermore, the reference numeral 24 denotes operation switches that include a group of various types of switches. The reference numeral 25 denotes an EEPROM that is an electrically rewritable read-only memory in which programs for performing various types of control and the like, data for use in performing various types of operations, and the like are stored in advance. The reference numeral 26 denotes a battery, the reference numeral 28 denotes a flash light emitting unit, the reference numeral 27 denotes a switching circuit that controls flash light emission of the flash light emitting unit 28, and the reference numeral 29 denotes a display element such as an LED for displaying success/failure of AF operation.

Note that the storage memory that is a storage medium for storing image data and the like is a fixed type semiconductor memory such as a flash memory, and is card-shaped or stick-shaped. Furthermore, in addition to the semiconductor memory such as a card-shaped flash memory that is formed so as to be detachable with respect to the device, various types of memories, namely, a magnetic storage medium such as a hard disk or a flexible disk, are applicable to the storage memory.

Furthermore, the operation switches 24 include a main power switch, a release switch, a reproduction switch, a zoom switch, a switch for switching on/off the display of a focus evaluation value signal on a monitor, and the like. The main power switch is a switch for starting the image capturing apparatus 1, and supplies power thereto. Furthermore, the release switch starts a shooting operation (storage operation) and the like. The reproduction switch starts a reproduction operation. The zoom switch moves the zoom lens group 2 of the imaging optical system and causes the zoom lens group 2 to perform zooming. Also, the release switch is made from a two-stage switch, namely, a first stroke (hereinafter, referred to as "SW1") that generates an instruction signal for starting AE processing and AF processing that are performed prior to the shooting operation, and a second stroke (hereinafter, referred to as "SW2") that generates an instruction signal for starting the actual exposure operation.

Description of Various AF Evaluation Values

Figure 2:
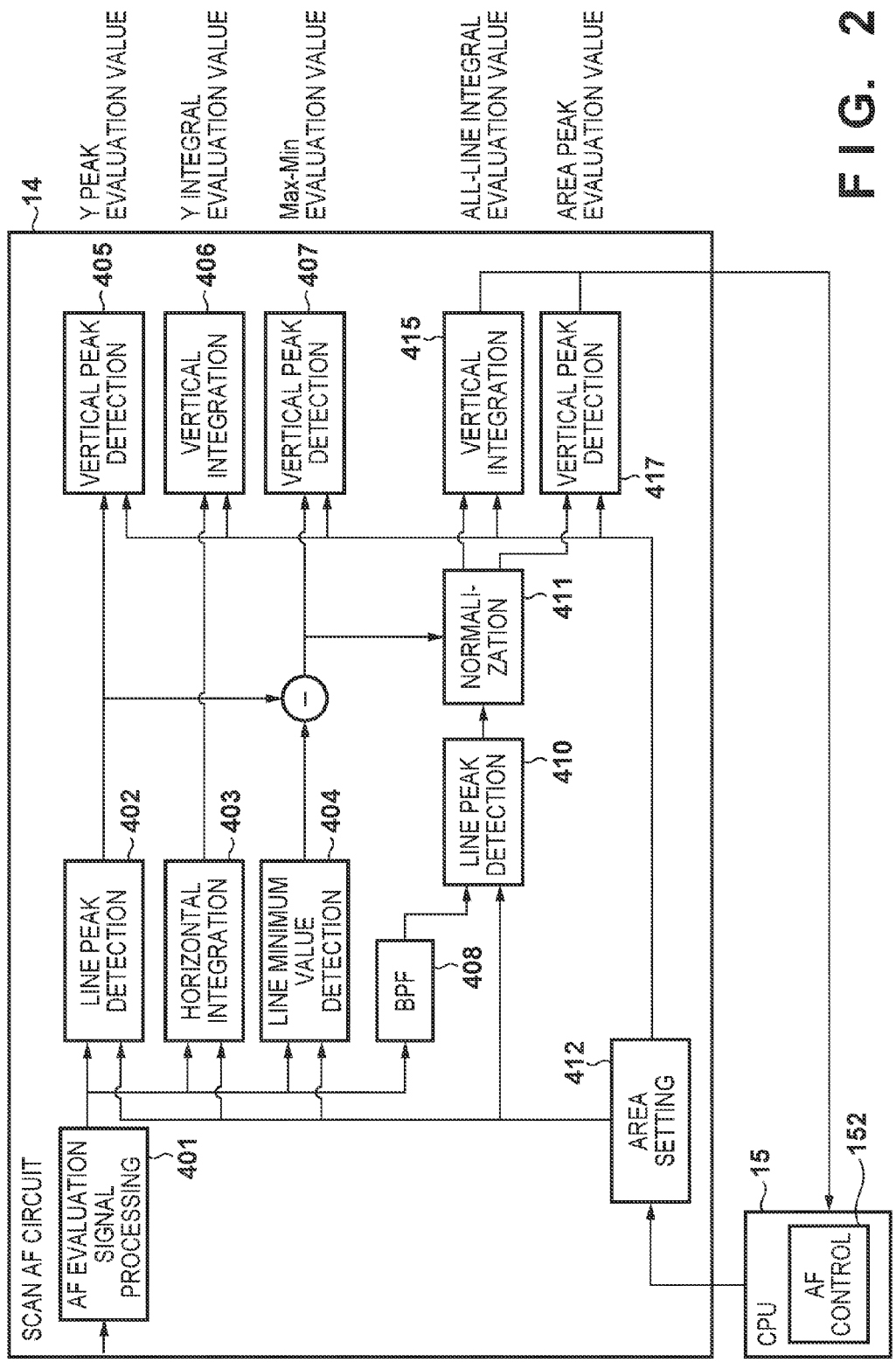
FIG. 2 is a block diagram illustrating a circuit for calculating various AF evaluation values according to the embodiment.

Hereinafter, various AF evaluation values that are calculated using the CPU 15 and the scan AF processing circuit 14 of FIG. 1 will be described with reference to FIG. 2.

When the digital signal converted by the A/D conversion circuit 7 is input to the scan AF processing circuit 14, an AF evaluation signal processing circuit 401 calculates a luminance signal R (red), a luminance signal G (green), a luminance signal B (blue), and a luminance signal Y obtained by converting the RGB luminance signals. Then, gamma-correction processing is performed in which a low luminance component is highlighted and a high luminance component is suppressed. Hereinafter, the luminance signal Y, the luminance signal R, the luminance signal G, and the luminance signal B are collectively referred to as a luminance signal group. The various AF evaluation values below are calculated respectively for the four types of luminance signals. The four types of luminance signals may be generated based on output signals that are photoelectrically converted at different timings or at the same timing by the image sensor 5. Furthermore, focus evaluation values may be calculated only for luminance signals for use in detecting a focus adjustment direction (described later).

In the case where the plurality of types of luminance signals are generated based on output signals photoelectrically converted at the same timing, luminance signals of colors that are different every row of pixels (row group) forming the image sensor may be acquired. For example, in the case of an image sensor having well-known Bayer-arrangement color filters, the image sensor includes a row of pixels in which color filters are arranged in the order of RGRG . . . , and a row of pixels in which color filters are arranged in the order of GBGB . . . . Therefore, either or both of a luminance signal R and a luminance signal G can be acquired from the RG row, and either or both of a luminance signal G and a luminance signal B can be acquired from the GB row. If the four types of luminance signals are acquired and processing that will be described later is performed, the calculation load will increase because the number of signals to be processed is large. On the other hand, more efficient signal processing can be performed by selecting the luminance signals that are to be acquired from the RG row and the GB row depending on the color of the luminance signal for use in detecting the focus adjustment direction (described later). Furthermore, since luminance signals of different colors can be acquired based on the output signals photoelectrically converted at the same timing, it is possible to increase the reliability in detection of the focus adjustment direction (described later).

First, a method for calculating a Y peak evaluation value will be described. A gamma-corrected luminance signal group is input to a line peak detection circuit 402 for detecting a line peak value of each horizontal line. This circuit obtains a Y line peak value of each horizontal line within an AF evaluation range set by an area setting circuit 412. Furthermore, the output of the line peak detection circuit 402 is input to a vertical peak detection circuit 405. This circuit holds the peak in a vertical direction within the AF evaluation range set by the area setting circuit 412, and generates a Y peak evaluation value. The Y peak evaluation value is effective for determination whether the subject is a high luminance subject or a low luminance subject.

Hereinafter, a method for calculating a Y integral evaluation value will be described. The gamma-corrected luminance signal group is input to a horizontal integration circuit 403 for detecting an integral value of each horizontal line. This circuit obtains a Y integral value of each horizontal line within the AF evaluation range set by the area setting circuit 412. Furthermore, the output of the horizontal integration circuit 403 is input to a vertical integration circuit 406. This circuit performs integration in a vertical direction within the AF evaluation range set by the area setting circuit 412, and generates a Y integral evaluation value. Based on the Y integral evaluation value, the brightness of the entire AF evaluation range can be estimated.

Hereinafter, a method for calculating a Max-Min evaluation value will be described. The gamma-corrected luminance signal group is input to the line peak detection circuit 402, and the Y line peak value of each horizontal line within the AF evaluation range is obtained. Furthermore, the gamma-corrected luminance signal group is input to a line minimum value detection circuit 404. This circuit detects the minimum value of the luminance signal of each horizontal line of the luminance signal group within the AF evaluation range. The detected line peak value and minimum value of the luminance signal of each horizontal line are input to a subtractor, where (the line peak value–the minimum value) is calculated, and the result is input to a vertical peak detection circuit 407. This vertical peak detection circuit 407 holds the peak in the vertical direction within the AF evaluation range, and generates a Max-Min evaluation value. The Max-Min evaluation value is effective for the determination whether the contrast is low or high.

Hereinafter, a method for calculating an area peak evaluation value will be described. The gamma-corrected luminance signal group is filtered by a BPF (bandpass filter) 408 so that a specific frequency component (spatial frequency component) is extracted, and a focus signal is generated. This focus signal is input to a line peak detection circuit 410 for detecting a line peak value of each horizontal line. The line peak detection circuit 410 obtains a line peak value of each horizontal line within the AF evaluation range. The obtained line peak value is normalized with a difference between the line peak value and the minimum value of the luminance signal of each horizontal line by a normalization circuit 411. The normalized line peak value is peak-held within the AF evaluation range by a vertical peak detection circuit 417, and an area peak evaluation value (normalized focus evaluation value) is generated. The area peak evaluation value is effective for the determination of restart for shifting an in-focus state to processing for re-searching for an in-focus point because the area peak evaluation value hardly changes even when the subject is moved within the AF evaluation range.

Hereinafter, a method for calculating an all-line integral evaluation value (integrated value) will be described. Similarly to the area peak evaluation value, the line peak detection circuit 410 obtains a line peak value of each horizontal line within the AF evaluation range. Then, the obtained line peak value is normalized with a difference between the line peak value and the minimum value of the luminance signal of each horizontal line by the normalization circuit 411. The normalized line peak values are input to a vertical integration circuit 415, and an all-line integral evaluation value is generated by performing integration with respect to all horizontal scan lines in the vertical direction within the AF evaluation range. In the present embodiment, the all-line integral evaluation value that changes depending on the defocus state and is used for focus adjustment is referred to as a focus evaluation value. The all-line integral evaluation value has a wide dynamic range and a high sensitivity through the influence of the integration, and thus is effective as a main evaluation value for AF for detecting an in-focus position.

According to the present embodiment, when an all-line integral evaluation value is calculated, a line peak value of the focus signal obtained by extracting a specific frequency component is normalized, for each line, with a difference between the line peak value and the minimum value of the luminance signal of each line. Accordingly, it is possible to reduce the influence of the contrast (a difference between the brightest and the darkest) of the subject for each line. For example, even when a line has a large contrast of green and a small contrast of red, it is possible to perform comparison between focus evaluation values from which a difference in contrast of the subject is eliminated by the normalization that is performed here. In the present embodiment, each line is referred to as a unit focus detection area. Furthermore, a line peak value of the focus signal obtained by extracting a specific frequency component for each line is referred to as a unit area evaluation value, and a signal obtained by normalizing the line peak value of the focus signal obtained by extracting a specific frequency component is referred to as a normalized unit area evaluation value.

The area setting circuit 412 generates a gate signal for AF evaluation range for selecting a signal present at a predetermined position on a screen set by the CPU 15. The gate signal is input to the line peak detection circuit 402, the horizontal integration circuit 403, the line minimum value detection circuit 404, the line peak detection circuit 410, the vertical integration circuits 406 and 415, and the vertical peak detection circuits 405, 407, and 417, and the timing at which the luminance signal group is input to the circuits is controlled so that each focus evaluation value is generated by the luminance signal group in the AF evaluation range.

Furthermore, a plurality of types of all-line integral evaluation values in which different frequency components are extracted may be calculated. Accurate focus detection can be performed based on an evaluation value calculated using a BPF of higher frequency band, but the evaluation value is likely to be affected by noise included in the luminance signal. On the other hand, focus detection based on an evaluation value calculated using a BPF of lower frequency band is less accurate, but the evaluation value is not likely to be affected by noise included in the luminance signal. Therefore, an appropriate one of all-line integral evaluation values of a plurality of bands can be used depending on the situation of noise included in the luminance signal, for example, the luminance value or the like of the subject. In the present embodiment, two types of a high-frequency band all-line integral evaluation value and a low-frequency band all-line integral evaluation value are calculated by switching the BPFs.

An AF control unit 152 performs AF control by taking in the focus evaluation values, controlling the focus lens driving motor 22 via the second motor-driving circuit 19, and moving the focus lens group 3 in the optical axis direction. The present embodiment has a configuration in which each type of AF evaluation values is calculated in the horizontal line direction, but a configuration is also possible in which each type of AF evaluation values is calculated in either or both of the horizontal direction and the vertical direction.

Description of Flowchart

Figure 3:
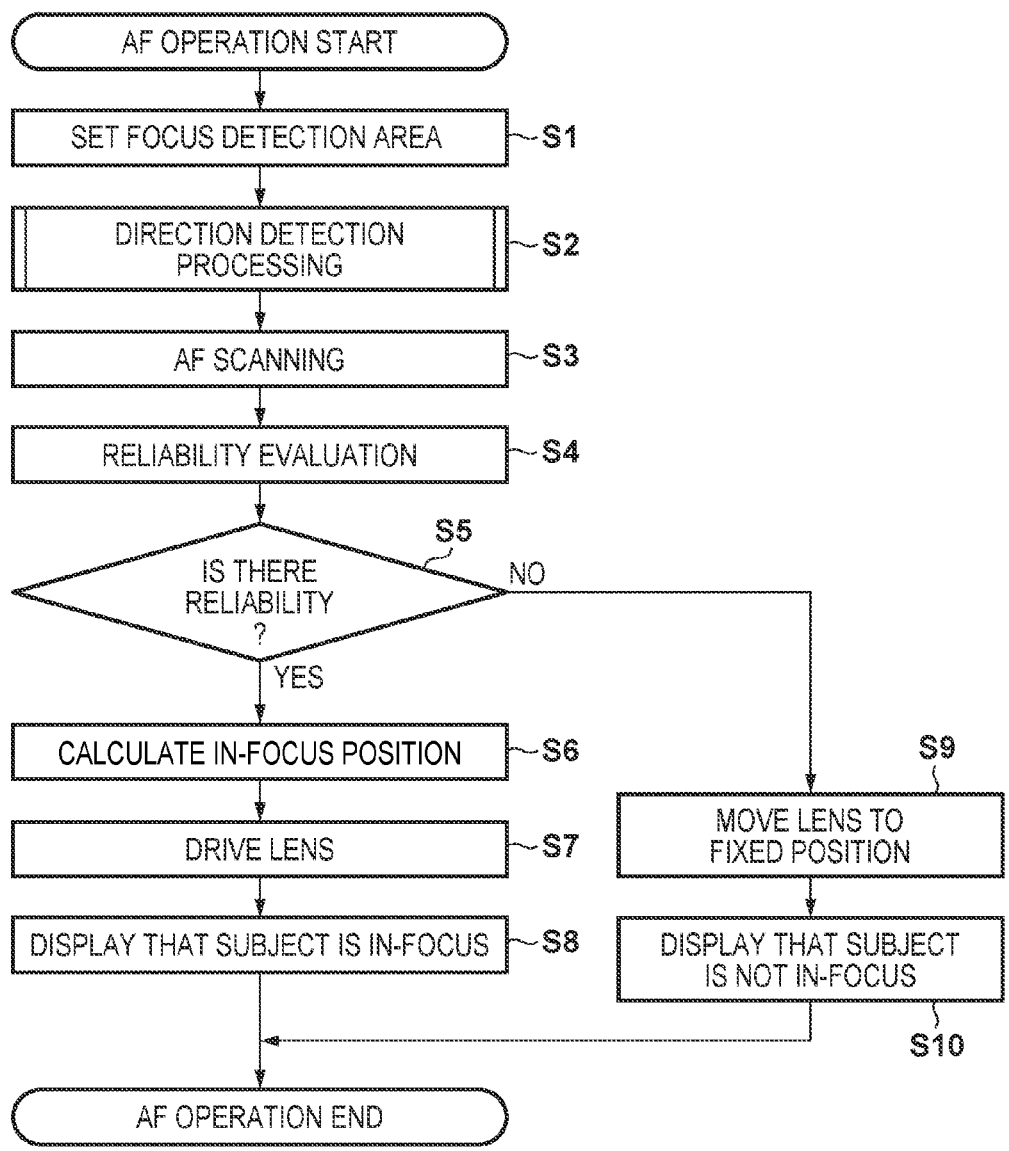
FIG. 3 is a flowchart illustrating a procedure of an AF operation according to the embodiment.

Hereinafter, a focusing on operation (AF operation) of the image capturing apparatus 1 having the above-described configuration will be described with reference to FIG. 3. FIG. 3 is a flowchart illustrating the procedure of the AF operation in the image capturing apparatus of the present embodiment. Control programs associated with this operation are executed by the CPU 15. After having started the AF operation, the area setting circuit 412 according to the present embodiment first sets an AF evaluation range in which focus adjustment is to be performed on the subject. In this processing of step S1, one focus detection area is set in an image.

Description of Setting of Focus Detection Area

Figure 4:
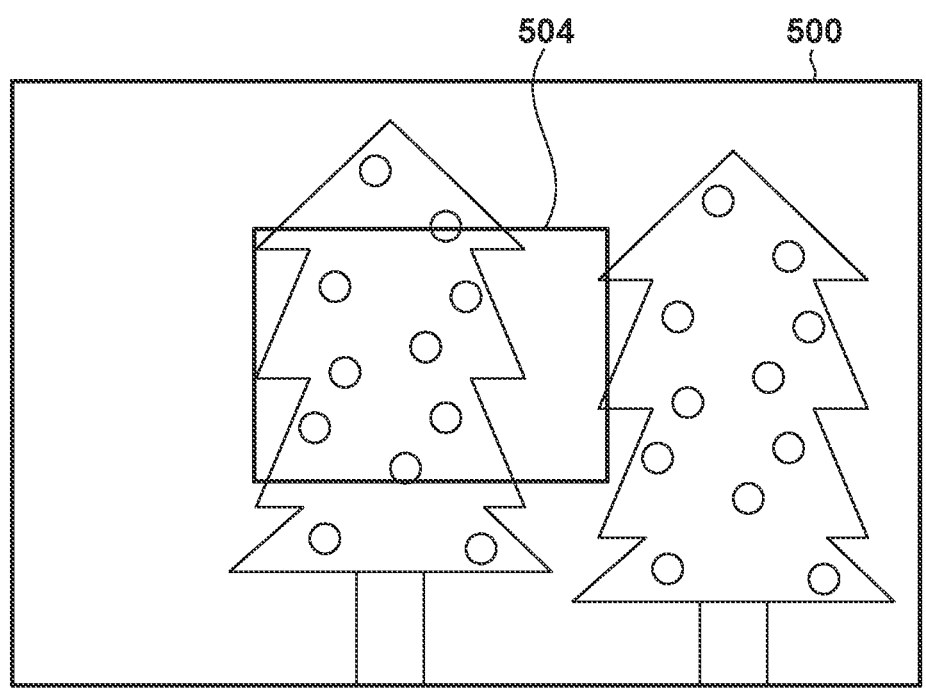
FIG. 4 is a diagram illustrating setting of a focus detection area according to the embodiment.

FIG. 4 is a diagram illustrating setting of an AF evaluation range serving as a focus detection area. In FIG. 4, an AF evaluation range 504 is set in the center of an imaging screen 500. The AF evaluation range 504 serving as a focus detection area is a range in which image signals for use in focus adjustment are evaluated by an AF operation (described later), and the purpose of the AF operation is to perform focus adjustment on a subject intended by a photographer, within the AF evaluation range 504 serving as a focus detection area. The AF evaluation range 504 corresponds to the focus detection area.

Returning to FIG. 3, the explanation of the flowchart is continued. In step S2, direction detection processing is performed. The direction detection processing is processing for detecting in which direction the focus lens group 3 is to be driven at the start of an AF operation. In the present embodiment, focus evaluation values of the colors are used to perform direction detection and reliability determination of a direction detection result. The direction detection processing will be described in detail later.

Then, in step S3, AF scanning (focus adjustment operation) is performed while calculating focus evaluation values in the focus detection areas set in step S1. In the AF scanning, while moving the focus lens group 3 by a predetermined amount from a scanning start position to a scanning end position, the above-described focus evaluation values at positions of the focus lens groups are stored in the CPU 15 by the scan AF processing circuit 14. With respect to the scanning end position, it is also possible that an end position is set prior to the scanning and AF scanning is performed, or scanning is stopped upon detection of the evaluation value exceeding the peak position. Furthermore, for detail of the AF scanning operation using the all-line integral evaluation value, a method as disclosed in, for example, FIGS. 8 to 13 of Japanese Patent Laid-Open No. 2012-137530 may be used.

Then, in step S4, reliability evaluation is performed with respect to the peak position (local maximum value) of the evaluation values obtained by the AF scanning in step S3. Here, the position of the focus lens group 3 at which the focus evaluation value calculated based on the luminance signal Y has the local maximum value, which is the peak value, is calculated. Furthermore, reliability of the change curve of the focus evaluation values in the vicinity of the local maximum value is evaluated. This reliability evaluation is to evaluate whether or not the obtained focus evaluation values have a change curve in the shape sufficient for obtaining the in-focus state of the subject.

A specific method of the reliability determination may be a method as described, for example, in FIGS. 10 to 13 of Japanese Patent Laid-Open No. 2010-078810.

That is, it is determined whether or not the focus evaluation values showing the in-focus state are in a mountain shape showing the high reliability, based on a difference between the maximum and minimum values of the focus evaluation values, the length of an inclination inclined at an angle that is a predetermined value (Slope Thr) or more, and the slope of the inclined part. Reliability determination can thus be performed.

If it is determined in step S5 that there is reliability based on the reliability determination result of step S4, the procedure advances to step S6. The CPU 15 computes the peak position base on the all-line integral evaluation value calculated based on the luminance signals Y, and then, in step S7, the AF control unit 152 drives the focus lens group 3 to the position that corresponds to the peak position. If in step S4, there are a plurality of reliable local maximum values of the focus evaluation values, the local maximum value indicating a focus lens position on a nearer side is set as the in-focus position, and the lens is driven. Also, in step S8, the CPU 15 performs display that the subject is in-focus, and the AF operation of the present embodiment ends.

On the other hand, if it is determined in step S5 that there is no reliability based on the reliability determination result of step S4, the procedure advances to step S9. In step S9, the CPU 15 drives the focus lens group 3 to a focus position at which the subject is highly likely to be present, the focus position being referred to as a "fixed point" set in advance. Then, in step S10, the CPU 15 performs display that the subject is not in-focus, and the AF operation of the present embodiment ends. As focus evaluation values for use in AF operation in the present embodiment, a high-frequency band all-line integral evaluation value and a low-frequency band all-line integral evaluation value may be used in a switched manner depending on the contrast, luminance and the like of a subject, taking into consideration the focus detection accuracy and S/N of the focus evaluation value.

Description of Direction Detection Processing

Thereinafter, the direction detection processing that is performed in step S2 of FIG. 3 will be described with reference to FIG. 5. The direction detection processing that is performed in this subroutine uses focus evaluation values that are calculated based on a luminance signal R, a luminance signal G, and a luminance signal B to detect a focus adjustment direction to approximate the in-focus state. Furthermore, reliability determination for determining whether or not the detected focus adjustment direction is obtained as a highly reliable detection result.

In step S201, focus evaluation values of the colors are acquired. Then, in step S202, reliability determination is performed with respect to the acquired focus evaluation values of the colors. The reliability of the focus evaluation values of the colors is determined quantitatively by detecting unevenness in color of the subject in the focus detection area, a difference between patterns of the colors, and the like using a plurality of methods. The detail thereof will be described later.

Then, in step S203, it is determined whether or not the reliability of the focus evaluation values of the colors is high. If it is determined that the reliability is low, the procedure advances to step S208, where it is determined that the focus adjustment direction is not detectable. On the other hand, if it is determined that the reliability of the focus evaluation values of the colors is high, the procedure advances to step S204, where the magnitude relations of the focus evaluation values between at least two colors are compared with each other. Here, the comparison between the magnitude relations of the focus evaluation values between the different colors will be described with reference to FIG. 6.

Figure 6:
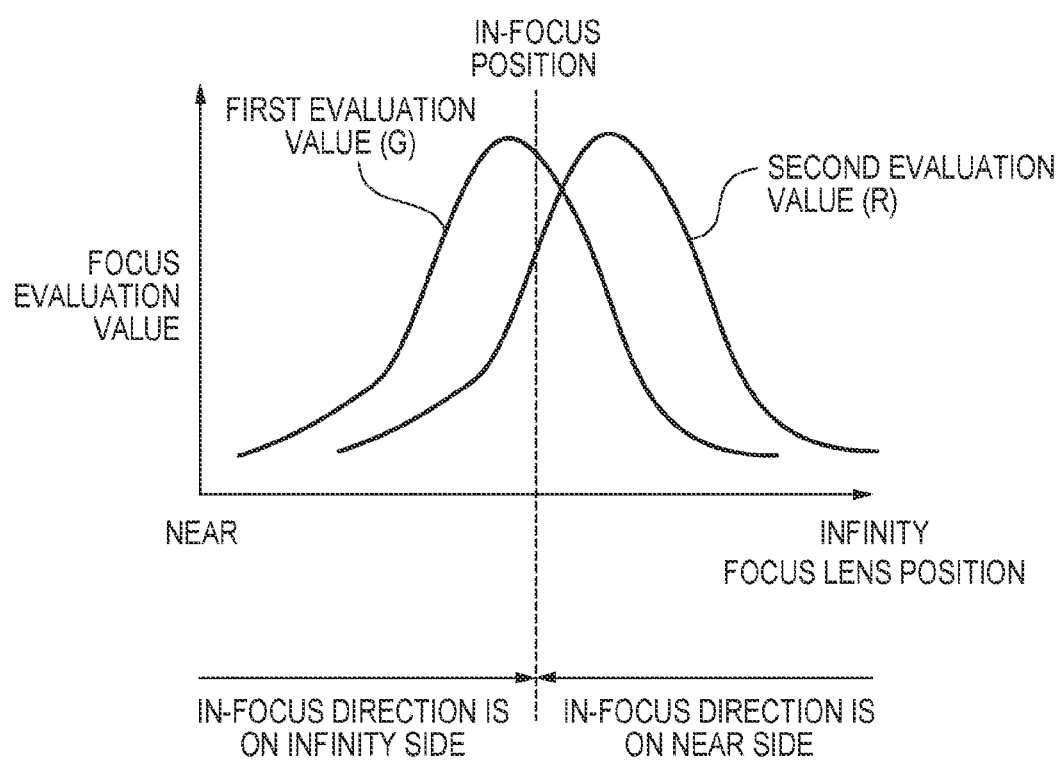
FIG. 6 is a diagram illustrating the relation between focus lens positions and focus evaluation values of luminance signals according to the embodiment.

FIG. 6 illustrates focus evaluation values calculated based on the luminance signals R and G. The horizontal axis denotes the focus lens positions at which the focus evaluation values are acquired. The vertical axis denotes the magnitudes of the focus evaluation values. Here, the focus evaluation value obtained based on the luminance signal G is a first focus evaluation value, and the focus evaluation value obtained based on the luminance signal R is a second focus evaluation value. The dotted line of FIG. 6 denotes the in-focus position. As shown in FIG. 6, the focus lens positions at which the focus evaluation values of the colors have the local maximum value are different, and the mountain shapes of the focus evaluation values of the colors are arranged while being laterally shifted with respect to each other, due to chromatic aberration of the imaging optical system. Therefore, the first focus evaluation value is greater than the second focus evaluation value on the near side with respect to the in-focus position, and the second focus evaluation value is greater than the first focus evaluation value on the infinity side with respect to the in-focus position excepting the vicinity of the in-focus position. The amount of positional deviation between the local maximum values of the focus evaluation values of the two colors only needs to be stored in the image capturing apparatus in advance, because it depends on the imaging optical system. By storing, for every zooming state and focus adjustment state of the imaging optical system, the amounts of positional deviations between the local maximum values of the focus evaluation values of colors, it is possible to select the colors of the focus evaluation values to be compared depending on the state of the imaging optical system. As is clear also from FIG. 6, the greater the distance between the local maximum values of the focus evaluation values for use in the comparison is, the easier the focus adjustment direction can be determined.

Figure 5:
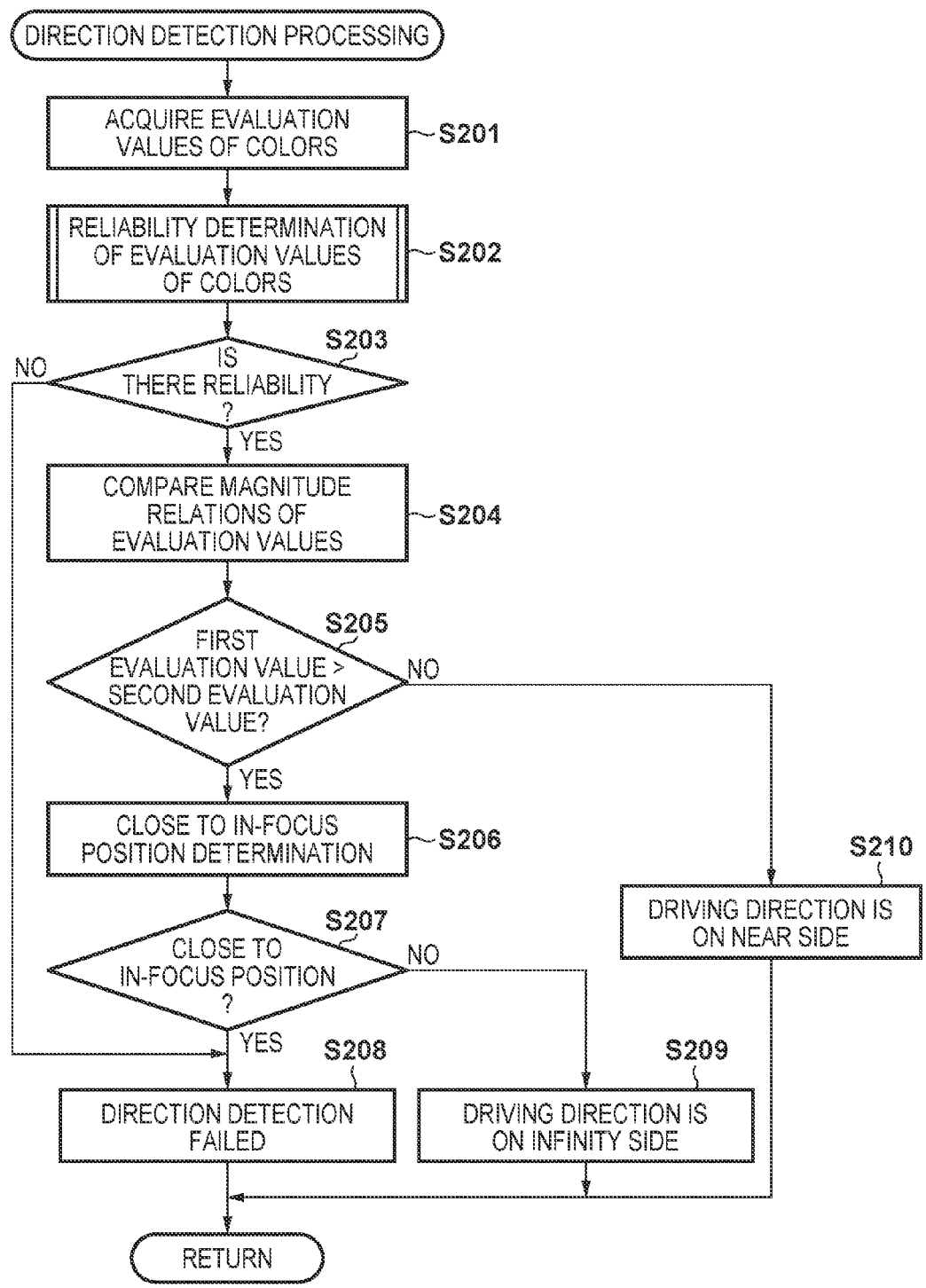
FIG. 5 is a flowchart illustrating a subroutine of direction detection processing according to the embodiment.

Returning to the explanation of the subroutine of FIG. 5. In step S204, the magnitude relations of these focus evaluation values are compared. A method for comparing the magnitude relations may be a method for obtaining a difference or a ratio.

Then, in step S205, it is determined whether or not the first focus evaluation value is greater than the second focus evaluation value. If the second focus evaluation value is the first focus evaluation value or greater, the procedure advances to step S210, where it is determined that the direction (focus adjustment direction) in which the focus lenses are driven is on the near side. As shown in FIG. 6, the focus lens position that corresponds to the case where the second focus evaluation value is the first focus evaluation value or more is always on the infinite far side with respect to the in-focus position, and thus it is possible to determine that the focus adjustment direction is on the near side.

On the other hand, if the first focus evaluation value is greater, the procedure advances to step S206, where close to in-focus position determination is performed. The close to in-focus position determination is to determine whether or not the current focus lens position is close to the in-focus position. Various types of determination methods are conceivable, and for example, an area peak evaluation value may be used to determine the in-focus degree. The area peak evaluation value hardly changes with respect to the movement of the subject as described above, and also hardly changes with respect to a change in the luminance value of a subject pattern since the area peak evaluation value is normalized. Therefore, if the area peak evaluation value is greater than a predetermined value, it is possible to determine that the focus lens position is close to the in-focus position. Furthermore, another focus detection means may be provided to perform the close to in-focus position determination. As another focus detection means, a device in which an image sensor provided with a focus detection pixel performs focus detection of the phase difference detection type, a device in which light is projected from a camera on a subject, and its reflected light is received, thereby performing focus detection, or the like is conceivable.

The close to in-focus position determination is performed in step S206, and if it is determined in step S207 that the focus lens position is close to the in-focus position, the procedure advances to step S208, where it is determined that the focus adjustment direction is not detectable. If it is determined in step S207 that focus lens position is not close to the in-focus position, the procedure advances to step S209, where it is determined that the focus lens driving direction (focus adjustment direction) is on the infinite far side. As shown in FIG. 6, since the focus lens position that corresponds to the case where the first focus evaluation value is greater than the second focus evaluation value and the current focus lens position is not close to the in-focus position is always on the near side with respect to the in-focus position, it is possible to determine that the focus adjustment direction is on the infinite far side.

When determination as to the focus adjustment direction has been made in any one of steps S208, S209, and S210, the subroutine of the direction detection processing ends and the procedure advances to step S3 of FIG. 3.

Figure 7:
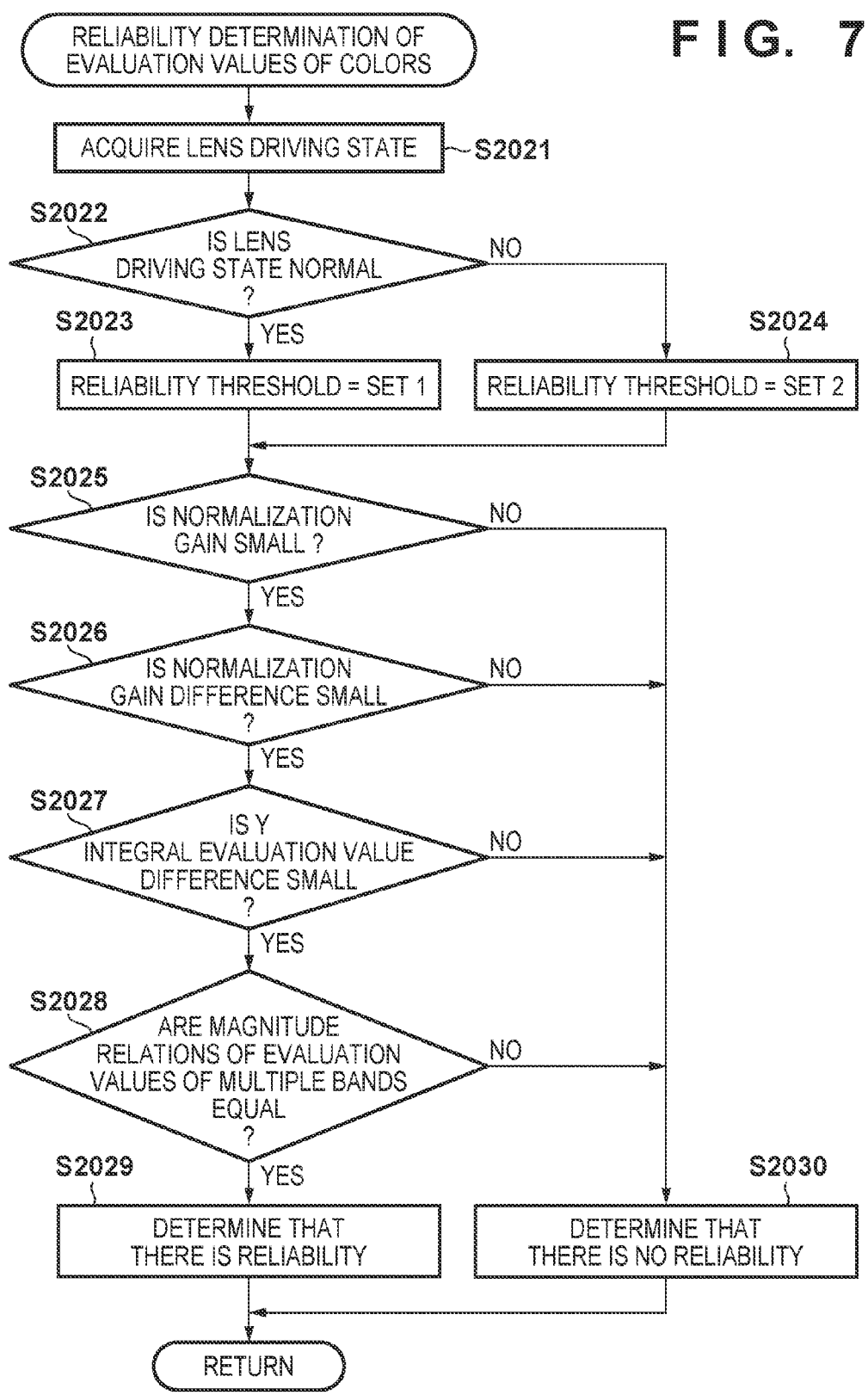
FIG. 7 is a flowchart illustrating a subroutine of determination of the reliability of evaluation values of colors according to the embodiment.

Description of Reliability Determination Processing of Focus Evaluation Values of Colors Hereinafter, reliability determination of evaluation values of the colors that is performed in step S202 of FIG. 5 will be described with reference to FIG. 7. The reliability determination processing that is performed in this subroutine is to determine whether or not luminance signals for use in performing accurate direction detection determination could be acquired, based on some types of information.

In step S2021, a lens driving state is acquired. Commonly, luminance signals obtained when the driving speed of the focus lenses is high or the focus lenses are driven in the inverted driving direction, or focus evaluation values obtained by the luminance signals have an inaccurate correspondence relation with a focus lens position. Therefore, direction detection processing that is performed using the focus evaluation values is also less reliable. In step S2021, information on the driving speed and information on whether or not the focus lenses are driven in the inverted driving direction are acquired as the current focus lens driving state.

Then, in step S2022, the lens driving state is determined. If the driving speed is a predetermined value or more or the focus lenses are driven in the inverted driving direction, it is determined that the driving state is other than the normal state, and the procedure advances to step S2024, where "threshold set 2" is set as a threshold for reliability determination to be performed later. On the other hand, if it is determined that the driving state is the normal state, the procedure advances to step S2023, where "threshold set 1" is set as a threshold for reliability determination to be performed later.

The threshold sets will be descried with reference to FIG. 8. Thresholds (coefficients) for use in normalization gain determination, normalization gain difference determination, and Y integral evaluation value difference determination, which serve as reliability determination that is to be performed later, are stored as one threshold group in advance in the EEPROM 25. If "threshold set 1" is selected as reliability thresholds in step S2023, thresholds A1, B1, and C1 of FIG. 8 are set. On the other hand, if "threshold set 2" is selected as reliability thresholds in step S2024, thresholds A2, B2, and C2 of FIG. 8 are set.

After step S2023 or S2024, the procedure advances to step S2025, where it is determined whether or not the magnitude of the normalization gain is smaller than the threshold. The normalization gain refers to the magnitude of the multiplication value for use in the normalization processing that is performed when an all-line integral evaluation value is calculated. The normalization gain is assumed to be an average of gains set for lines within the focus detection area. Because multiplication values for use in the normalization processing on the luminance signals of the colors are different depending on the brightness distribution of the subject, it is determined whether or not the normalization gains of the luminance signal R, the luminance signal G, and the luminance signal B are smaller than the set respective thresholds. If the normalization gain is large, the obtained all-line integral evaluation value includes a large amount of noise, and thus is less reliable. Since the detection of the focus adjustment direction of the present embodiment is performed based on the magnitude relations of the calculated all-line integral evaluation values between the plurality of colors, the reliability of the direction detection is reduced if the all-line integral evaluation value includes a large amount of noise. In step S2025, the reliability of the all-line integral evaluation value obtained based on the luminance signal of each color is determined based on the normalization gain. If the normalization gain of the color for use in detecting the focus adjustment direction is the threshold or more, the procedure advances to step S2030, where it is determined that the detection result of the focus adjustment direction is less reliable.

If the normalization gain of the color for use in detecting the focus adjustment direction is smaller than the threshold, the procedure advances to step S2026, where it is determined whether or not a difference between normalization gains of all-line integral evaluation values of the colors is small. If there is a difference between the normalization gains of the all-line integral evaluation values of the colors for use in detecting the focus adjustment direction, it is considered that the contrast (a difference between the brightest and the darkest) of the subject varies between the colors. Since the detection of the focus adjustment direction is performed based on the magnitude relations of the all-line integral evaluation values between a plurality of colors, the determination accuracy of the magnitude relations of the all-line integral evaluation values will deteriorate if there is a difference between the normalization gains. If, in step S2026, the normalization gains of the all-line integral evaluation values for use in detecting the focus adjustment direction are equal to each other in a predetermined range, it is determined that the reliability is high. If it is determined, in step S2026, that the normalization gain difference is the threshold or more, the procedure advances to step S2030, where it is determined that the detection result of the focus adjustment direction is less reliable.

If it is determined, in step S2026, that the normalization gain difference is smaller than the threshold, the procedure advances to step S2027, where it is determined whether or not a difference between the Y integral evaluation values of the colors is small. As described above, the Y integral evaluation value indicates the brightness in the AF evaluation range, and if there is a difference between the colors, this indicates that the colors have different brightness. Since the detection of the focus adjustment direction is made based on the magnitude relations of the all-line integral evaluation values between a plurality of colors, the determination accuracy of the magnitude relations of the all-line integral evaluation values will deteriorate if the Y integral evaluation values have a difference. In step S2027, it is determined that the reliability is high if differences in the Y integral evaluation values of the colors are equal to each other in a predetermined range. If it is determined, in step S2027, that the difference in the Y integral evaluation values is the threshold or more, the procedure advances to step S2030, where it is determined that the detection result of the focus adjustment direction is less reliable.

If it is determined, in step S2027, that the difference in the Y integral evaluation values is smaller than the threshold, the procedure advances to step S2028, where it is determined that the magnitude relations of the evaluation values between a plurality of bands are constant. As the evaluation values of the plurality of bands, the high-frequency band all-line integral evaluation value and the low-frequency band all-line integral evaluation value are used. The focus evaluation values having different evaluation bands show the spatial frequency characteristics of the subject, and the focus evaluation values that are different between the colors show that spatial frequency characteristics, that is, subject patterns are different between the colors. Since the detection of the focus adjustment direction is made based on the magnitude relations of the all-line integral evaluation values between the plurality of colors, the determination accuracy of the magnitude relations of the all-line integral evaluation values will deteriorate if the spatial frequency characteristics of the subject differ between the colors.

The spatial frequency characteristics of the subject of each color will be described with reference to FIGS. 9A and 9B. Similarly to FIG. 6, both of FIGS. 9A and 9B show the relation between the focus lens positions and the focus evaluation values. In FIG. 9A, of the first focus evaluation value obtained based on the luminance signal G, "G focus evaluation value High" denotes high-frequency band all-line integral evaluation values and "G focus evaluation value Low" denotes low-frequency band all-line integral evaluation values. Similarly, in FIG. 9B, of the second focus evaluation value obtained based on the luminance signal R, "R focus evaluation value High" denotes high-frequency band all-line integral evaluation values and "R focus evaluation value Low" denotes low-frequency band all-line integral evaluation values. The first focus evaluation value obtained based on the luminance signal G of FIG. 9A is such that the G focus evaluation value High is larger than the G focus evaluation value Low in the vicinity of the in-focus position at which the first focus evaluation value is the local maximum value, thus showing that the green subject pattern has a large amount of high frequency components. On the other hand, the second focus evaluation value obtained based on the luminance signal R of FIG. 9B is such that the R focus evaluation value High is lower than the R focus evaluation value Low in the vicinity of the in-focus position, thus showing that the red subject pattern has a larger amount of low frequency components. As shown in FIGS. 9A and 9B, by comparing the magnitude relations of differences or ratios in focus evaluation values of different bands between the colors, it is possible to determine the degree of coincidence in the spatial frequency characteristics of the subject for each color. In step S2028, it is determined whether or not the magnitude relations of the focus evaluation values of different bands are equal to each other between R and G based on the comparison with the thresholds. The number of the bands of focus evaluation value for use in this determination is not limited to two, and the magnitude relations of the focus evaluation values obtained by evaluating the larger number of bands may be used. Although the use of the evaluation values having a larger number of bands increases the calculation load, it is possible to improve the reliability determination accuracy.

If it is determined, in step S2028, that the magnitude relations of the focus evaluation values of different bands are different between the colors, the procedure advances to step S2030, where it is determined that the detection result of the focus adjustment direction is not reliable. On the other hand, if it is determined that the magnitude relations of the focus evaluation values of different bands are equal to each other between the colors, the procedure advances to step S2029, where it is determined that the detection result of the focus adjustment direction is reliable.

After the completion of step S2029 or S2030, the subroutine of the reliability determination of the evaluation values of the colors is performed, and then the procedure advances to step S203 of FIG. 5. In this subroutine, reliability determination has been performed by a plurality of methods, but it is not necessary to perform all the methods. Only necessary reliability determination are to be performed depending on the permissible computation amount.

As described above, by using an evaluation value normalized with a contrast for each line as a focus evaluation value, it is possible to improve the reliability of detection of the focus adjustment direction based on the comparison between the focus evaluation values of different colors. Furthermore, reliability determination for determining the reliability of the detection result of the focus adjustment direction, it is possible to reduce the frequency of occurrences in which a false focus adjustment direction is detected. Furthermore, as reliability determination, focus evaluation values of different magnitudes of gains or different bands, or the like at the time of normalization are used, making it possible to perform accurate reliability determination. Furthermore, it is configured such that the threshold for reliability determination is changed depending on the driving state of the lens, making it possible to improve the detection accuracy of the focus adjustment direction.

Although the present embodiment has a configuration in which detection of the focus adjustment direction is performed once at the start of an AF operation, the detection may be repeatedly performed during the AF scanning of step S3 of FIG. 3. This increases the computation amount, but early acknowledgement of false direction detection can be realized, resulting in an improvement in reliability. Furthermore, in the case other than the direction detection processing is performed, normalization at the time of calculation of an all-line integral evaluation value or calculation of a focus evaluation value of each color may be omitted. By omitting the normalization processing or reducing the number of types of focus evaluation values, a reduction in the computation amount can be realized. The normalization processing and calculation of a focus evaluation value of each color are performed at the start of AF of a video image or a still image so as to detect the direction, but otherwise, the direction detection may be omitted.

Description of Mobile Phone

The configuration and operation of the above-described embodiment are also applicable to a mobile phone. A mobile phone according to the present embodiment has, in addition to a voice phone call function, e-mail function, the Internet connection, the image shooting function, the reproduction function, and the like. The above-described embodiment is applicable to the image shooting function.

A communication unit of the mobile phone communicates sound data or image data with another telephone by a communication method in compliance with a communication carrier contracted by a user. At the time of a voice phone call, a sound processing unit converts sound data from a microphone into a format appropriate for transmission and transmits the converted sound data to the communication unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-003605, Jan. 9, 2015, which is hereby incorporated by reference herein in its entirety.

What is claimed is:

1. An image capturing apparatus comprising:
an image sensor configured to photoelectrically convert a subject image formed by an imaging optical system;
a focus adjusting unit configured to adjust a focus state of the subject image on the image sensor;
an acquisition unit configured to acquire luminance signals of colors from signals obtained from a plurality of unit focus detection areas forming a focus detection area of the image sensor;
a normalization unit configured to normalize the acquired luminance signals of the colors of the unit focus detection areas using the signals obtained from the unit focus detection areas;
a calculation unit configured to calculate normalized focus evaluation values of the colors that indicate a focus state of the subject image using the normalized luminance signals of the colors; and
a determination unit configured to determine a driving direction of the focus adjusting unit based on magnitude relations of a first normalized focus evaluation value that corresponds to a first color and a second normalized focus evaluation value that corresponds to a second color.

2. The image capturing apparatus according to claim 1, wherein the calculation unit calculates the first normalized focus evaluation value based on signals acquired from a first row group, which is formed by a plurality of rows of the image sensor, and the second normalized focus evaluation value based on signals acquired from a second row group, which is formed by a plurality of rows of the image sensor that are different from the first row group.

3. The image capturing apparatus according to claim 1, further comprising:
a switching unit configured to switch between a case where the normalized focus evaluation values are calculated and a case where not the normalized focus evaluation values but focus evaluation values are calculated with the focus detection area serving as one unit focus detection area.

4. The image capturing apparatus according to claim 1, further comprising:
an estimation unit configured to estimate reliability of the determination of the driving direction by the determination unit, using a signal that corresponds to the first color of the image sensor and a signal that corresponds to the second color of the image sensor.

5. The image capturing apparatus according to claim 4, wherein the estimation unit estimates the reliability by comparing a plurality of first normalized focus evaluation values with a plurality of second normalized focus evaluation values that are obtained by a plurality of spatial frequency components being filtered out, for each of a plurality of spatial frequencies.

6. The image capturing apparatus according to claim 4, wherein the estimation unit estimates the reliability using a coefficients for use in calculating the first normalized focus evaluation value and the second normalized focus evaluation value, or an integrated value of signals for use in calculating the first normalized focus evaluation value and the second normalized focus evaluation value.

7. The image capturing apparatus according to claim 4, wherein the estimation unit changes a threshold for use in the estimation of reliability depending on a driving state of the focus adjusting unit.

8. The image capturing apparatus according to claim 1, wherein the first color is green, and the second color is red.

9. The image capturing apparatus according to claim 1, wherein the unit focus detection area is an area that corresponds to each row of the focus detection area.

10. The image capturing apparatus according to claim 1, wherein the normalization unit normalizes the luminance signals of the colors of the unit focus detection area using a difference between a maximum value and a minimum value of the luminance signal of each color in the unit focus detection area.

11. A method for controlling an image capturing apparatus that includes an image sensor configured to photoelectrically convert a subject image formed by an imaging optical system, and a focus adjusting unit configured to adjust a focus state of the subject image on the image sensor, the method comprising:
acquiring luminance signals of colors from signals obtained from a plurality of unit focus detection areas forming a focus detection area of the image sensor;
normalizing the acquired luminance signals of the colors of the unit focus detection areas using the signals obtained from the unit focus detection areas;
calculating normalized focus evaluation values of the colors that indicate a focus state of the subject image using the normalized luminance signals of the colors; and
determining a driving direction of the focus adjusting unit based on a magnitude relations of a first normalized focus evaluation value that corresponds to a first color and a second normalized focus evaluation value that corresponds to a second color.

12. A non-transitory computer-readable storage medium having stored therein a program for causing a computer to execute the steps of a method for controlling an image capturing apparatus that includes an image sensor configured to photoelectrically convert a subject image formed by an imaging optical system, and a focus adjusting unit configured to adjust a focus state of the subject image on the image sensor, the method comprising:
acquiring luminance signals of colors from signals obtained from a plurality of unit focus detection areas forming a focus detection area of the image sensor;
normalizing the acquired luminance signals of the colors of the unit focus detection areas using the signals obtained from the unit focus detection areas;
calculating normalized focus evaluation values of the colors that indicate a focus state of the subject image using the normalized luminance signals of the colors; and
determining a driving direction of the focus adjusting unit based on a magnitude relations of a first normalized focus evaluation value that corresponds to a first color and a second normalized focus evaluation value that corresponds to a second color.

\* \* \* \* \*